Jan. 2, 1945.   C. B. FITES   2,366,606
PRESSURE LIMITING MEANS FOR BRAKING SYSTEMS
Filed Oct. 1, 1943   2 Sheets-Sheet 1
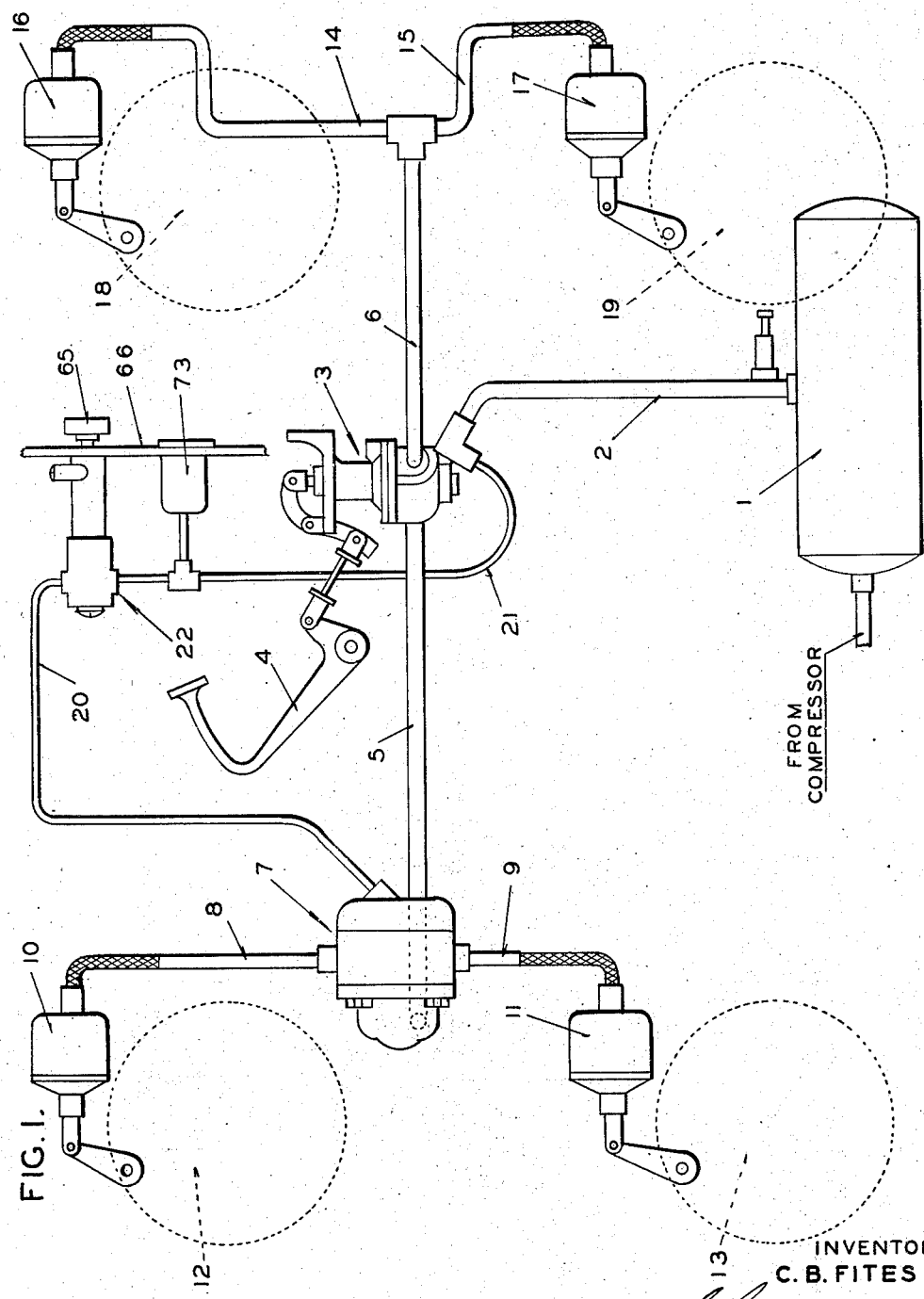
FIG. I.
INVENTOR
C. B. FITES
BY
ATTORNEY

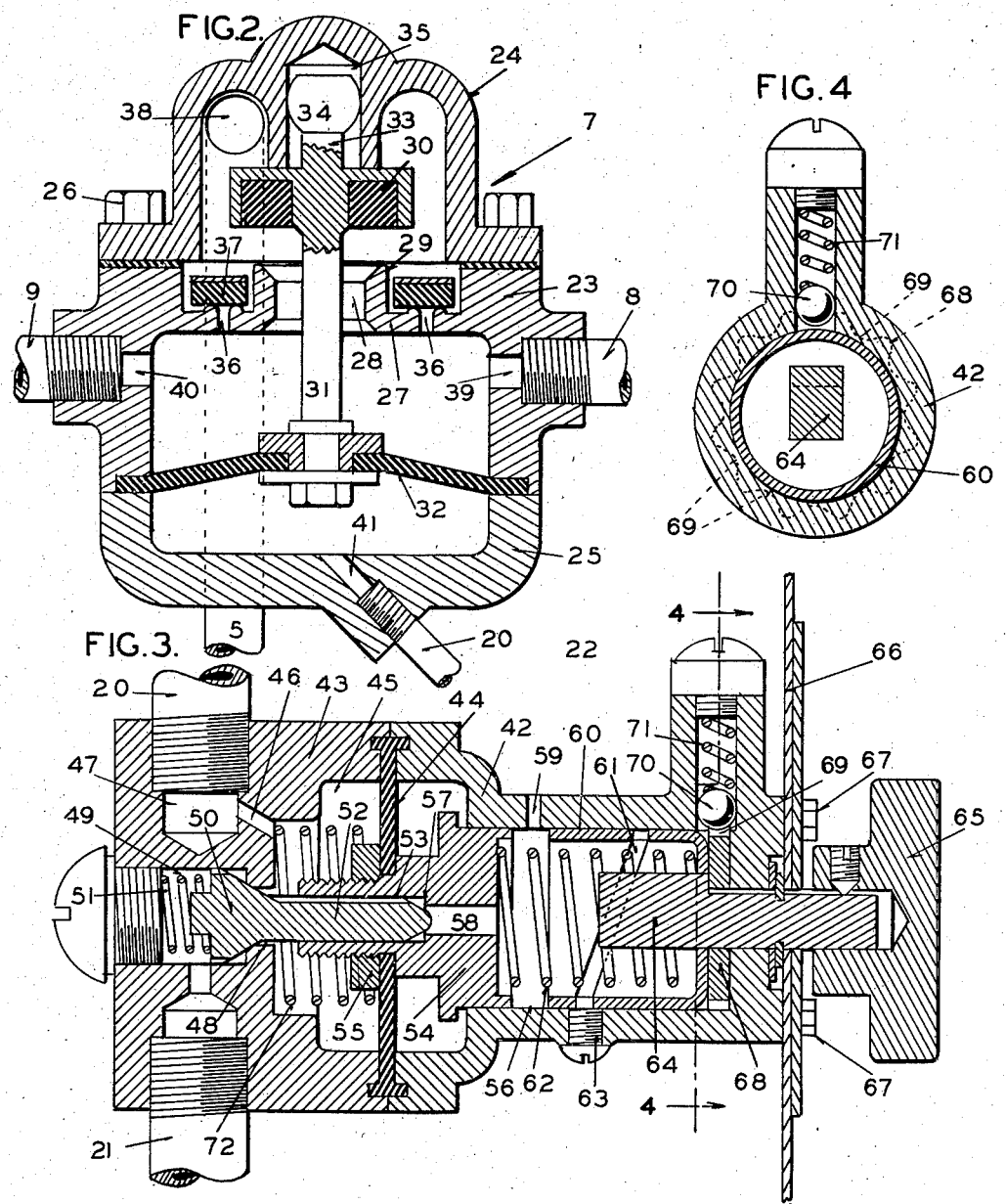

Patented Jan. 2, 1945

2,366,606

UNITED STATES PATENT OFFICE 2,366,606

PRESSURE LIMITING MEANS FOR BRAKING SYSTEMS

Cyril B. Fites, St. Johns, Mo., assignor to Wagner Electric Corporation, St. Louis, Mo., a corporation of Delaware Application October 1, 1943, Serial No. 504,545

10 Claims. (Cl. 188—152)

My invention relates to fluid pressure systems and more particularly to improved means for limiting the fluid pressure which can be effective in a device to be actuated.

One of the objects of my invention is to provide a pressure limiting means in a fluid pressure system which can be so controlled from a remote point by fluid under pressure as to permit the varying of the limit of pressure at will.

Another object of my invention is to provide improved remote control means for a pressure limiting valve means of a fluid pressure system which will permit the pressure limit to be efficiently varied and also facilitate installation in the system.

Other objects of my invention will become apparent from the following description taken in connection with the accompanying drawings in which Figure 1 is a schematic view showing a fluid pressure braking system embodying my invention; Figure 2 is a sectional view showing details of the pressure limiting valve means; Figure 3 is a longitudinal sectional view showing details of the pressure adjusting valve means; and Figure 4 is a sectional view taken on lines 4—4 of Figure 3.

Referring to the drawings in detail and first to Figure 1, numeral 1 indicates a storage tank for compressed air which is connected to a suitable supply source such as an air compressor. Leading from this tank is a conduit 2 which is connected to an application valve 3 controllable by a foot pedal 4. The application valve may be of any well-known construction but preferably of the metering type wherein a predetermined pressure of air may be permitted to pass therethrough when the foot pedal is depressed a predetermined distance. The application valve has leading therefrom two conduits 5 and 6, the former being connected to a pressure limiting valve means 7 forming part of the means embodying my invention. From this limiting valve means lead branch conduits 8 and 9 which convey air under pressure to power cylinders 10 and 11, said power cylinders being connected to actuate the brake assemblies 12 and 13 shown in dotted lines. The other conduit 6 is directly connected to branch conduits 14 and 15 which lead to power cylinders 16 and 17, respectively, employable in actuating brake assemblies 18 and 19.

The brake assemblies 12 and 13 may be associated with the front wheels of the vehicle and the brake assemblies 18 and 19 may be associated with the rear wheels of said vehicle in the event the system is to be employed on a single vehicle. Under conditions where it is desired to employ the fluid pressure system on a tractor-trailer vehicle, the brake assemblies 12 and 13 may be associated with the tractor vehicle and the brake assemblies 18 and 19 may be associated with the trailer vehicle. If additional brakes are required to be operated on the tractor vehicle, such may be done by extending the branch lines from the pressure limiting valve to other brake actuating power cylinders. Also, if additional trailer vehicle brakes are desired to be operated besides brakes 18 and 19, such may be done by extending the branch conduits 14 and 15 to other brake actuating power cylinders.

The pressure limiting valve 7 is interposed between conduit 5 and branch conduits 8 and 9 in order to limit the amount of fluid under pressure which may become effective in the power cylinders 10 and 11. This becomes important on a single vehicle since under certain conditions, such as icy highways, it may be desirable to limit the braking action on the front dirigible wheels of the vehicle. On a tractor-trailer vehicle it may be desirable to limit the braking pressure which may be applied to the tractor brakes only.

The pressure limiting valve 7 is adapted to be controlled by fluid pressure from the source of supply in order that the limit of said pressure limiting means may be varied. This is accomplished by connecting the pressure limiting valve means 7 to conduit 2 by means of conduits 20 and 21 and controlling the flow of pressure to the limiting valve means by a pressure adjusting valve means 22. The conduits 20 and 21 are much smaller than conduit 5 through which the air flows to the power cylinders 10 and 11. The pressure adjusting valve is hand-controlled and located at any convenient point such as the instrument panel of the vehicle. By adjusting the pressure adjusting valve 22 the pressure effective in conduit 20 may be varied and this varying pressure will vary the limit of the limiting valve means as will become apparent when the detailed structure of the pressure limiting valve means and the pressure adjusting valve means has been described.

A preferred form of construction of the pressure limiting valve means is shown in Figure 2. This valve means comprises an inverted cup-shaped casing 23, a top cap 24 and a bottom cap 25, said caps being secured to the casing by bolts 26. The wall 27 of casing 23 situated between the upper cap 24 and the interior of casing 23 is provided with a central opening 28 and associated therewith is a valve seat 29 facing toward the interior of cap 24. Cooperating with this valve seat is a valve element 30 carried on a stem 31 which projects through opening 28 into the interior of casing 23 where it is connected to a diaphragm 32 clamped between casing 23 and the bottom cap 25. The valve element 30 also carries an upward extending projection 33 having a ball-shaped end 34 which is positioned in a bore 35 of the upper cap to provide guiding means for the valve element and the stem. The wall 27 surrounding the opening 28 is provided with a plurality of small holes 36 with which an annular valve disc 37 cooperates, thereby providing a check valve means for said holes whereby fluid can pass through the holes to the top cap but is prevented from passing through in the opposite direction. Conduit 5 coming from the application valve is connected to inlet port 38 in cap 24 and branch conduits 8 and 9 leading to the power cylinders 10 and 11 are connected to outlet ports 39 and 40 in the casing member 23 above diaphragm 32. The cap 25 is provided with an inlet port 41 below the diaphragm to which is connected the small conduit 20 coming from the pressure adjusting valve 22.

The details of the preferred form of adjusting valve means is shown in Figure 3. This valve means comprises two casing members 42 and 43 between which is clamped a diaphragm 44 forming a chamber 45. Chamber 45 is in constant communication by a passage 46 and a port 47 with small conduit 20 leading to the pressure limiting valve means. The casing member 43 has a centrally located inlet port 48 leading to a bore 49 to which is connected conduit 21 coming from the source of pressure. Associated with this inlet port is a valve element 50 normally biased by a spring 51 to a seated position to close said port. This valve element is provided with a grooved stem 52 which extends into a bore 53 in a member 54 clamped to the diaphragm 44 by a nut 55, said member 54 being guided in a bore 56 in the casing member 42. The inner end of the stem of the valve element is cone-shaped and cooperates with a seat 57 at the end of a passage 58 leading from bore 53 to bore 56, said latter bore being in communication with the atmosphere through an opening 59.

Within bore 56 is a cup-shaped sleeve 60 having a spiral slot 61 therein. Interposed between the sleeve and member 54 is a spring 62 whereby the sleeve, when reciprocated, can apply pressure to member 54 and thus move it to the left as viewed in Figure 3. The slot 61 in the sleeve receives the inner end of a screw 63 so that upon rotation of the sleeve, the sleeve will be moved to the left. The means for rotating this sleeve comprises a shaft 64 which is journaled in the end of the casing member 42, said shaft and sleeve being connected for simultaneous rotation yet permitting the sleeve to move relatively to the shaft. This is accomplished by the sleeve being provided with a rectangular opening which receives a rectangular portion of the shaft. The outer end of the shaft is provided with a knurled knob 65 whereby the shaft can be rotated by hand. The casing of the valve means is secured to the instrument panel 66 by suitable bolts 67. In order to maintain shaft 64 in different adjusted positions, the shaft has secured thereto a disc 68 provided with recesses 69 in its periphery, said recesses cooperating with a ball 70 to which a spring 71 applies pressure. The ball and spring are mounted in a portion of the casing member 42.

When the parts of the valve means are as shown, spring 62 is not under any compression and, therefore, valve element 50 will be seated and the cone-shaped end 53 on the stem thereof will be unseated under the action of a very light spring 72 interposed between diaphragm 44 and casing member 43. By turning knob 65, sleeve 60 can be moved to the left and spring 62 compressed. The action of this compressed spring will cause member 54 to be moved to the left, thus bringing seat 57 onto the cone-shaped end of stem 52 and closing passage 58. When the valve stem 52 has been engaged, additional movement to the left will open valve element 50. Thus fluid under pressure from the pressure tank can flow from conduit 21 to conduit 20 and act upon the diaphragm 32 of the pressure limiting valve means 7. The pressure of the fluid which is effective on diaphragm 32 of the pressure limiting valve will be determined by the force of spring 62. When the pressure in chamber 45 and also in the pressure limiting valve reaches sufficient value to move diaphragm 44 to the right and overcome the force exerted by spring 62, valve element 50 will be permitted to close.

For example, if the pressure admitted through the pressure adjusting valve means is ten pounds per square inch, then this pressure will be effective on diaphragm 32 to hold valve element 30 of the limiting valve means open. The pressure acting on the diaphragm will determine the limit of the fluid pressure which can become effective in the power cylinders 10 and 11 whenever the application valve is operated. If operation of application valve 3 permits twenty pounds per square inch of air pressure to be admitted to conduits 5 and 6, only slightly greater than ten pounds of pressure will become effective in power cylinders 10 and 11 since, when such pressure is built up in casing member 23, it will act on the upper surface of diaphragm 32 and overcome the ten pounds of pressure below the diaphragm and thereby move valve element 30 downwardly and close hole 28. No more air under pressure can now pass between conduit 5 and conduits 8 and 9.

If it is desired to limit the pressure which can be admitted to power cylinders 10 and 11 to a higher value, knob 65 of the pressure adjusting valve will be rotated an additional amount to further compress spring 62. This will cause a reopening of valve element 50 and a rise of the fluid pressure acting upon the lower surface of diaphragm 32. When the pressure increases sufficiently to compress spring 62, the valve element will re-close. If this pressure is thirty pounds per square inch, then valve element 30 will be closed when the pressure acting upon the upper surface of diaphragm 32 is slightly greater than thirty pounds per square inch. If the pressure adjusting valve is set to admit a high fluid pressure to the underside of the diaphragm of the pressure limiting valve 7 and it is desired to lower the pressure, knob 65 will be given a reverse rotation. This will move sleeve 60 to the right and thus weaken the pressure of spring 62. Consequently, the pressure which is acting in chamber 42 will now push the diaphragm to the right, together with member 54. This will open passage 58 and permit the exhausting of some of the air in chamber 42 and conduit 20, thus lowering the pressure effective on the underside of diaphragm 32. When the pressure in chamber 45 has been lowered to where spring 62 can again bring about a movement of member 54 to the left, passage 58 will again become closed.

It is seen that by the pressure limiting valve means and the pressure adjusting valve means, the fluid pressure which is to become effective in certain power cylinders of a fluid pressure system can be limited as desired by merely turning a knob which is situated on the instrument panel. It is also to be noted that with the two valve means and the manner in which they are embodied in the system, important advantages result. In prior known systems the pressure limiting valve means is mounted on the instrument panel and controlled by hand and there is no pressure adjusting valve means employed. In such a construction it is necessary to use extra length of large size piping to make the instrument panel installation of the pressure limiting valve means. This piping has to be mounted in places where space is at a premium and thus the installation is difficult. With my improved system embodying the pressure limiting valve means and the pressure adjusting valve means, the pressure limiting valve means can be placed at any convenient point in the system and it is not necessary to run any large conduit such, for example, as a one-half inch pipe to and from the instrument panel in order to accommodate the pressure limiting valve means. As shown in the drawings, the pressure limiting valve may be mounted at the juncture of conduits 5, 8, and 9, thus replacing a T-fitting. The piping used for conduits 20 and 21, which are associated with the pressure adjusting valve means can be very small as, for example, a three-sixteenths inch pipe. Such piping is easily bendable and can be readily installed. The cost thereof is considerably less than the one-half inch pipe which is required if the pressure limiting valve is hand-controlled and mounted on the instrument panel as in prior systems. Furthermore, this small piping can be an extension of the piping which is already employed for connecting a pressure gauge, such as the one indicated at 73 (Figure 1), mounted on the instrument panel. It is thus seen that my improved fluid pressure system produces advantages not heretofore present in prior systems.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, a source of fluid pressure, two devices to be operated by fluid pressure, a control valve, conduit means between the source and control valve, conduit means between the control valve and one of the devices, conduit means between the control valve and the other device, shut-off valve means for one of the last named conduit means, and means separate from said shut-off valve for automatically closing the shut-off valve means when the fluid pressure in the device reaches a predetermined value, said last named means comprising a member controlled by fluid pressure admitted through the control valve and an established fluid pressure producing a force opposing said fluid under pressure admitted through the control valve.

2. In a fluid pressure system, a source of fluid pressure, two devices to be operated by fluid pressure, a control valve, conduit means between the source and control valve, conduit means between the control valve and one of the devices, conduit means between the control valve and the other device, shut-off valve means for one of the last named conduit means, means for automatically closing the shut-off valve means when the fluid pressure in the device reaches a predetermined value, said last named means comprising a member controlled by fluid pressure admitted through the control valve and an established fluid pressure producing a force opposing said fluid under pressure admitted through the control valve, and means for varying at will the value of the established fluid pressure.

3. In a fluid pressure system, a source of fluid pressure, two devices to be operated by fluid pressure, a control valve, conduit means between the source and control valve, conduit means between the control valve and one of the devices, conduit means between the control valve and the other device, shut-off valve means for one of the last named conduit means, means for automatically closing the shut-off valve means when the pressure in the device reaches a predetermined value, and means for controlling the shut-off valve means to permit it to close at varying pressures, said last named means comprising fluid pressure-operated means for opposing the closing of the shut-off valve means and means operable at will for varying the fluid pressure in the fluid pressure-operated means.

4. In a fluid pressure system, a source of fluid pressure, two devices to be actuated by fluid pressure, conduit means between the source and the devices, a control valve for simultaneously admitting equal fluid pressures to the conduit means from the source, and means associated with the conduit means for limiting the value of the fluid pressure which can be employed to actuate one of the devices, said last named means comprising a shut-off valve, means for closing the shut-off valve by fluid pressure from the source admitted through the control valve and means separate from said shut-off valve controlled by fluid pressure for determining the value of the shut-off valve closing pressure.

5. In a fluid pressure system, a source of fluid pressure, two devices to be actuated by fluid pressure, conduit means between the source and the devices, a control valve for simultaneously admitting equal fluid pressures to the conduit means from the source, means associated with the conduit means for limiting the value of the fluid pressure which can be employed to actuate one of the devices, said last named means comprising a shut-off valve, a movable member connected to control the closing of the shut-off valve and movable by fluid pressure admitted through the control valve, means for providing fluid pressure to oppose the moving of the movable member to valve closed position, and means for varying the opposing fluid pressure at will.

6. In a fluid pressure braking system for two sets of brakes, a source of air pressure, means comprising a control valve for causing air under pressure from the source to actuate both sets of brakes, means for limiting the air pressure which can be effective to actuate one set of brakes, said means comprising a shut-off valve, a member acted upon by air under pressure from the source for biasing the shut-off valve open, said member also being subject to air pressure controlled by the control valve and acting to close the shut-off valve, and means for varying the pressure of the air which acts to bias the shut-off valve open.

7. In a fluid pressure system, shut-off valve means for preventing flow of fluid through a conduit after a predetermined pressure is reached and comprising a shut-off valve element, a member connected to move the element to valve closed position, means for moving the member by fluid pressure in the conduit, means for applying fluid pressure force to the member opposing the moving of the member to valve closed position, means for varying the opposing fluid pressure, and a check valve-controlled by-pass for the shut-off valve means permitting return of fluid through the conduit when the valve element is closed.

8. In a fluid pressure system, shut-off valve means for preventing flow of fluid through a conduit and comprising a valve seat and a shut-off valve element, a chamber associated with the shut-off valve means and positioned beyond the valve seat in the direction of flow of fluid through the conduit, a movable wall for said chamber, means for connecting the movable wall to the valve element so that fluid pressure which has passed the valve element acts on a surface of the movable wall and applies a closing force to the valve element, means for establishing a fluid pressure to act on an opposed surface of the movable wall, and means for varying said fluid pressure.

9. In a fluid pressure system, shut-off valve means for preventing flow of fluid through a conduit and comprising a valve seat and a shut-off valve element, a diaphragm connected with the shut-off valve and positioned to have one side acted upon by a fluid pressure after it has passed the valve seat to thereby apply a closing force to the valve element, means for establishing a fluid pressure to act on the opposite side of the diaphragm, and means for varying said last named fluid pressure.

10. In a fluid pressure system, shut-off valve means for preventing flow of fluid through a conduit and comprising a valve seat and a shut-off valve element, a diaphragm connected with the shut-off valve and positioned to have one side acted upon by a fluid pressure after it has passed the valve seat to thereby apply a closing force to the valve element, means for establishing a fluid pressure to act on the opposite side of the diaphragm, means for varying said last named fluid pressure, a by-pass for the shut-off valve means, and check valve means for the by-pass permitting flow of fluid therethrough only from the diaphragm side of the valve seat to the other side.

CYRIL B. FITES.